Sept. 26, 1939.  C. A. BROCK  2,173,960
FILTER STRUCTURE FOR VACUUM CLEANERS
Original Filed Dec. 18, 1935   2 Sheets-Sheet 1
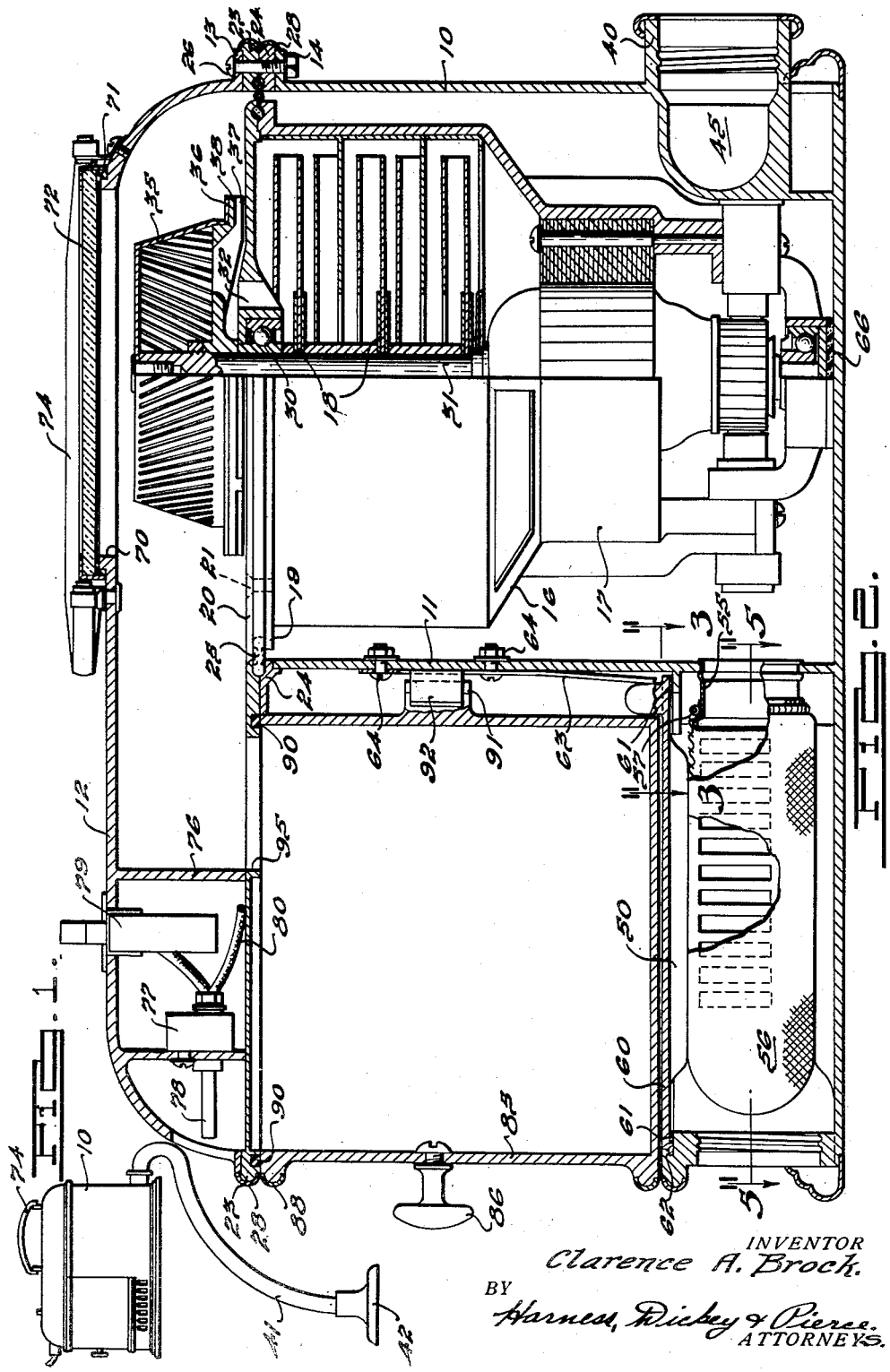
INVENTOR
Clarence A. Brock.
BY
Harness, Dickey & Pierce.
ATTORNEYS.

Sept. 26, 1939.   C. A. BROCK   2,173,960
FILTER STRUCTURE FOR VACUUM CLEANERS
Original Filed Dec. 18, 1935   2 Sheets-Sheet 2
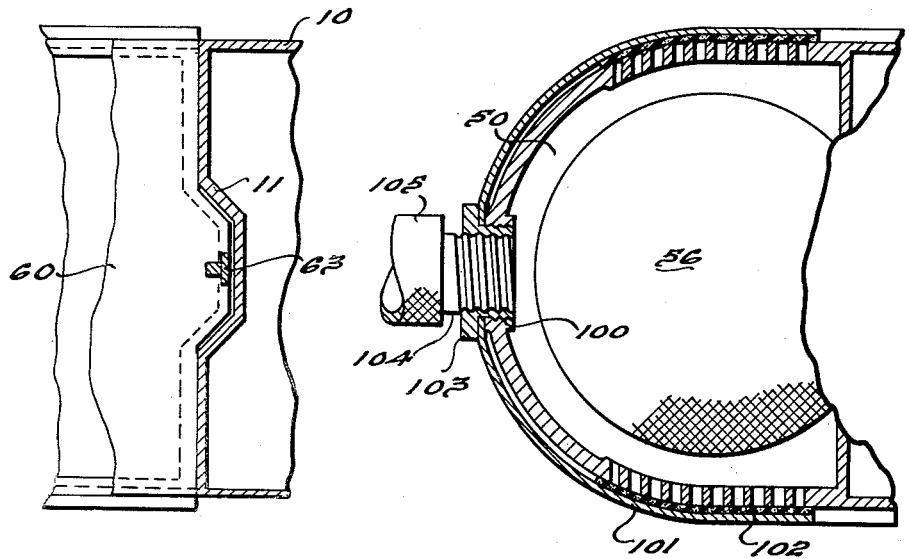
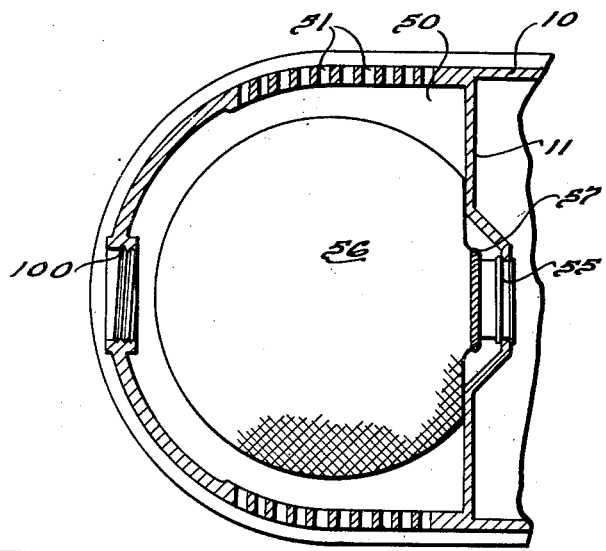
INVENTOR
Clarence A. Brock.
BY Harness, Dickey & Pierce.
ATTORNEYS.

Patented Sept. 26, 1939

2,173,960

UNITED STATES PATENT OFFICE 2,173,960

FILTER STRUCTURE FOR VACUUM CLEANERS

Clarence A. Brock, Detroit, Mich., assignor to Rexair, Inc., Detroit, Mich., a corporation of Delaware Original application December 18, 1935, Serial No. 54,966. Divided and this application July 6, 1937, Serial No. 152,071

1 Claim. (Cl. 183—51)

This application is a division of applicant's prior co-pending application Serial No. 54,966, which has now become Patent No. 2,158,717, May 16, 1939.

The invention set forth herein relates generally to vacuum cleaners and more particularly to a novel and improved form of vacuum cleaner construction embodying in a single unitary casing a mechanical dust separating unit and a filter for finally purifying air which has initially been purified by the mechanical dust separating means. The present invention contemplates the provision of a compartment within the main casing for housing said filter and in addition, contemplates the provision of a relatively easily accessible means whereby the filter may be bodily removed from the filter compartment in the event it is necessary to empty or clean the same.

The wall of the filter compartment is provided with a series of louvers or openings which serve to permit air passing through the filter bag to escape from the casing. In the event it is desired to utilize the apparatus of the present invention as a blower such as is often desirable in cleaning operations, means are provided to achieve this end. An aperture is provided for connecting a flexible conduit to the filter compartment in order that air discharged from the filter compartment will be discharged into the conduit.

The present invention contemplates the provision of means associated with the apparatus for connecting the flexible conduit which means includes a closure adapted to block the louvers or apertures in the wall of the casing thus insuring that all air delivered to the filter compartment will be discharged through the blower conduit.

Many other and further objects, advantages, and features of the present invention will become clearly apparent from the folowing specification when considered in connection with the accompanying drawings forming a part thereof.

In the drawings:

Figure 1 is a side elevational view of a dust separator element embodying the improvements of the present invention.

Fig. 2 is a vertical sectional view substantially enlarged taken longitudinally through the dust separator construction disclosed in Fig. 1.

Fig. 3 is a fragmentary sectional view taken substantially on the line 3—3 of Fig. 2 illustrating in detail the means for closing the filter compartment.

Fig. 4 is a fragmentary sectional view taken through the filter compartment illustrating in detail the interior construction and configuration of the filter compartment and disclosing a blower conduit secured in cooperative relation thereto.

Fig. 5 is a fragmentary transverse sectional view taken substantially on the line 5—5 of Fig. 2 illustrating in detail the manner in which the filter bag is disposed within the filter compartment.

With more particular reference to the drawings, the specific embodiment of the invention shown therein comprises in general a casing 10 which may be formed of composite sheet metal or other suitable construction and which is illustrated as a casting. The casing is preferaby generally oval in shape and is provided in its central portion with a vertically extending partition wall 11. The casing as a whole is open at the top and is adapted to receive a suitable cover 12. This cover 12 is provided with a flange 13 at its marginal edge adapted to mate with a corresponding flange 14 on the upper marginal edge of the casing 10.

On one side of the partition wall 11 in the casing 10 is mounted a blower housing 16 which has mounted therein a suitable electric motor 17 serving to drive a plurality of centrifugal fans 18 which provide a multiple stage blower construction tending to draw air axially downward through the blower housing 16. The blower housing is provided at its upper end with an annular flange 19 which has a groove in the axial face thereof. A cover plate 20 has a grooved face adapted to mate with the grooved flange 10 and is secured thereto by means of a suitable annular series of screws 21. A pair of partitioning members 23 and 24 have registering circular apertures therein slightly larger than the diameter of the flange 19 and associated cover plate 20, and have complemental circular grooves in their adjacent faces. An annular packing strip 25, having beaded edges, and preferably formed of rubber or suitable resilient composition, has one beaded edge clamped between the cover plate 20 and flange 19 by means of the screws 21 and has its other beaded edge clamped between the partitioning members 23 and 24 and securely locked in place by means of bolts 26. It will be appreciated that the bolts 26 not only serve to lock the partitioning members 23 and 24 in predetermined position but also serve to interlock the flange 14 on the casing 10 to the flange 13 on the cover 12, thus securing the cover to the casing structure. Inasmuch as the partitioning members 23 and 24 have their marginal edges, throughout some considerable extent, exposed exteriorly of the casing, throughout this exposed area they may be provided with suitable finish moldings 28 to provide an attractive exterior appearance.

The cover plate 20 has mounted substantially centrally thereof an annular series of ball bearings 30 in which is journaled a blower shaft 31. This blower shaft 31 is preferably directly connected to the electric motor 17 and serves to drive the vertical series of centrifugal fans 18 which tend to draw air downwardly through the blower housing. Surrounding the bearing structure 30 in the cover member 20 is an annular series of inlet apertures 32 which serve to permit the flow of air from the upper portion of the casing enclosed by the cover plate, downwardly into the multi-stage blower 18. Secured to the upper end of the shaft 31 of the blower, above the cover plate 20, is a mechanical dust separator element 35 adapted to be driven by the shaft.

While the element 35 may be formed in any convenient manner and from any desirable material, it has been found preferable to construct it from a single, integral sheet metal stamping to provide a frusto-conical structure having helically extending slots throughout substantially its entire peripheral surface. It is considered extremely important that no substantial imperforate peripheral surface of substantial area exists internally of the dust separator element because it has been found that if dust passes through the slots in the surface of the element, it tends to build up on such surfaces and hence necessitates relatively frequent removal of the dust separator element and cleaning of the interior thereof.

The specific shape of the separator element 35 has been found to be a very important factor in preventing the accumulation of dust interiorly thereof. It has been found that by accurately regulating the shape proportions of the separator elements building up of dust on the inside surface is effectively prevented. It has been found particularly satisfactory to form the dust separator element of a relatively short axial length so that its axial length is approximately one-third of the diameter of its large end and about one-half the diameter of its smaller end. The actual physical size of the element as a whole is relatively unimportant as long as the proper proportions are maintained. It has been further found particularly desirable that the separator be formed with a flat top which lies in a plane transverse to the axis of rotation of the element as a whole.

The dust separator element 35 is provided at its lower axial end with a radially extending flange 36 which is mounted on a suitable spider 38 secured to the shaft of the motor 31. It will be seen that as the motor 17 is run, air will be drawn inwardly through the slots in the separator element 35 by means of the centrifugal blowers 18 and dust in such air will impinge upon the rounded surfaces of the bars serving to define these slots and be centrifugally driven away. In order to insure that no dust-laden air will enter the necessary clearance between the dust separator element and the cover plate 20, a series of radially disposed vanes 37 are formed on the lower side of the spider 38. These vanes or blades act as a centrifugal fan and maintain a constant but relatively small outflow of air through this space, thus insuring that no dust-laden air will enter the interior of the dust separator element at this point. It will therefore be seen that all air which enters the interior of the blower housing will have been processed to remove the dust therefrom and that a much smaller, but equally constant outflow of air will be created by the vanes 37 operating in the clearance between the dust separator element and the cover plate 20, thus insuring that all air passing through the annular series of inlet ports 32 to the blowers will be substantially dust-free.

The casing 10 has an inlet opening 40 which may be formed integrally therewith and may be internally threaded to facilitate the connection of a flexible conduit 41 thereto which is adapted to be connected to any suitable nozzle, such for example as 42. An inlet duct 45 is connected to the inlet opening 40 and serves to provide communication between the inlet opening 40 and the space within the casing adjacent the dust separator element 35 above the partitioning members 23 and 24. This conduit 45 preferably extends arcuately around the electric motor 17 in the base of the casing and thence upwardly through suitable registering apertures in the partitioning members 23 and 24.

In the lower side of the casing on the opposite side of the partition wall from the portion in which the motor and blower are mounted, is a filter compartment generally designated as 50. Suitable louvers 51 are provided in the wall of the casing to permit the escape of air from the filter compartment 50. An outlet aperture is formed in the partition wall 11 to provide communication between the compartment housing, the motor and blower, and the filter compartment and this aperture has preferably permanently mounted therein a nipple 55 which is adapted to receive a dust filter bag 56 of a shape conforming substantially to the shape of filter compartment 50. This filter bag 56 is preferably secured on the nipple 55 by means of a garter spring 57 or other suitable securing means. The filter compartment is closed at its upper side by means of a removable partition member 60 seated on a suitable gasket 61 and having one of its edges secured in a recess 62 formed in the casing 10. The opposite edge of this partition member 60 is retained in position by means of a spring element 63 secured to the partition wall 11 by means of a pair of bolts 64. This spring element 63 has a further important function which will hereinafter be clearly seen.

From the foregoing, it will be clear that dust-laden air taken in by the nozzle 42 will be conducted through the flexible tube 41 into the inlet 40. From the inlet 40 it will be conducted upwardly through the partition walls 23 and 24 into the upper portion of the casing in which is located the rotary dust separator element 35. It will be clear that the suction pressure generated by the multi-stage fan 18 driven by the electric motor 17 will draw this dust-laden air toward the separator element 35 and that the separator element will function to remove from the air by centrifugal force, the dust particles, and will draw only substantially pure processed air downwardly through the blower housing. It will be seen that the only outlet for the air drawn into the blower housing is through the nipple 55 in the partition wall 11 and hence into the filter bag 56 secured thereto. The filter bag will, therefore, serve to collect any dust which was not extracted from the air by means of the centrifugal dust separator element 35 and consequently only substantially dust free air will be passed from the filter compartment 50 out through the louvers 51.

It will likewise be seen that due to the action of the blowers 18, a substantial pressure differential will be created between the compartment above the partitioning members 23 and 24 and the compartment in which the blower housing is mounted. Due to this substantial pressure differential the greater pressure in the lower compartment in which the blower housing is mounted, will tend to move the blower housing, blower and motor connected thereto, upwardly toward the area of decreased pressure. This upward movement of the blower housing and motor will be resisted by the resilient packing ring element 25 which is clamped between the partitioning elements 23 and 24 at its outer periphery and between the blower housing 16 and cover plate 20 in its inner periphery. This pressure differential has been found to be sufficiently great so that the entire blower housing, dust separator, blower and motor associated therewith, will be raised slightly when the blower is operated, thus tensioning the resilient packing element 25 and supporting the blower housing entirely free from the casing structure except for the interconnection of the resilient packing member 25. It will be appreciated that this construction serves materially to prevent the sound and vibration resulting from the relatively high speed operation of the blower and dust separator elements from being transmitted to the casing and consequently virtually eliminates the noise usually attendant upon the operation of machines of this general type. A resilient padding element 66 may be secured to the lower axial end of the motor in order to cushion this portion of the apparatus with respect to the casing 10. It will be appreciated, however, that as the blower is operated, the motor, blower housing, and dust separator, which together provide a substantially unit construction, will, due to the action of the blower, be raised from the floor of the casing 10 and will be maintained entirely out of contact therewith during the time the machine is operated. The function of the resilient cushioning member 66 is merely to provide a resilient seat for the blower housing during times when the machine is not in operation. Consequently, it will be seen that this resilient cushioning member serves to relieve the annular resilient member 25 from unnecessary strain in supporting the blower housing when the machine is not operating. It is to be particularly noted that the rubber ring 25 is placed under tension as the blower unit rises in operation. This is important from the standpoint of reducing the transmission of audible vibrations from the blower unit to the main casing as it has been found that were such rubber placed under compression, instead of tension, the reduction of noise would be rather insignificant as compared to the present case where the rubber is placed under tension.

A suitable circular aperture 70 is provided in the upper surface of the cover 12 and has surrounding it a packing member 71 upon which is seated a removably mounted glass cover panel 72 retained in position by means of a suitable frame 73. It will be clear that this cover panel 72 is sufficiently large in order that access may be had to the rotatable dust separator element 35 and that this element may be cleaned, adjusted, dismounted or replaced at will without disturbing the mounting of the cover 12 on the casing 10.

As may be desired, a handle 74 may be suitably secured to the top of the cover member 12 in order to provide convenient means for transporting the dust separating apparatus from place to place. The opposite end of the cover section 12 to that in which the rotary dust separator element is mounted is partitioned off by means of an integrally formed partition wall 76 which mates with the partition member 23 to provide a closed compartment at the upper end of the dust separator cover. In this compartment is mounted a suitable terminal block 77 to which is connected a cord 78 adapted to connect the dust separator with a suitable source of electric current. Also mounted within this compartment is a suitable switch 79 which serves to provide means by which the electric motor may be started and stopped. Connection wires 80 extend from the switch 79 and connector block 77 down to the electric motor 17.

In the space between this portion of the cover section 12, just described, and the upper surface of the filter compartment 50, is located a removable slidably mounted dust bin 85. This dust bin 85 preferably has an exterior face provided with a suitable handle 86 and mates closely with the adjacent walls of the casing 10 and cover 12. The upper marginal edge of the dust bin is preferably beaded and provided with a finish molding 88 which, when the dust bin is slid into position, will mate with the finish molding 28 on the lower partition member 24 to provide a substantial continuation thereof which it will be seen extends entirely around the dust separator casing. The drawer or dust bin 85 preferably extends substantially the full width of the casing 10 and the under side of the partition member 23 is preferably provided with a resilient sealing strip 90 seated therein throughout the extent which this partition element mates with the drawer in order to provide an effective and tight seal of the partition member 23 with respect to the top marginal edge of the bin 85. The rear wall of the bin on its exterior side substantially in the central portion thereof is provided with a spearhead 91 preferably formed integrally with the drawer and adapted to enter between the spaced prongs 92 of the spring element 63. These prongs 92 are preferably formed by bending suitable lateral projections on the spring element 63 between the points at which this spring element is secured to the partition wall 11. It will thus be appreciated that the dust bin 85 is maintained in predetermined position with respect to the casing in which it is mounted and that it is locked in position by means of the spring element 92 and the mating spearhead 91. It will further be seen that the top marginal edge of this drawer is effectively sealed by means of the resilient sealing element 90.

A suitable aperture 95 interconnects the portion of the casing in which the bin 85 is mounted with the portion of the casing surrounding the rotary separator element 35. Due to the centrifugal action of the rotary separator element 35 the dust particles in the air entering the portion of the casing in which this element is located will be driven to that portion farthest away from the rotary separator element 35 and will consequently drop directly into the dust bin 85. From the foregoing, it will be appreciated that as the nozzle 42 serves to draw dust from articles being cleaned, this dust will be conveyed through the inlet 40 and intake conduit 45 into the chamber surrounding the rotary dust separator element. At this point the dust particles will, by means of the rotary dust separator, be separated from the air and will drop into the bin 85. The clean air passes downwardly through the multiple stage blower and out through the filter bag 56 which serves to subject the air to further cleaning action. From the construction described above, it will be apparent that the dust bin 85 may be conveniently removed whenever it is desired by bodily separating it from the casing 10. Accumulated dust, therefore, may be emptied from the bin 85 at convenient intervals without in any way disassembling the machine.

At certain times it is found desirable to use a machine of this general type for providing a blast of air for various cleaning operations and other purposes. In order to conveniently effect this result, the filter compartment is provided with an aperture 100 internally threaded in substantially the same size and manner as the inlet aperture 40. In normal operation of the machine, this aperture 100 may be left open as may be desired and some of the exhausted air from the dust separator will be discharged therethrough. However, the greater portion of the exhausted air will pass outwardly through the louvers 51. While any suitable means may be used to close the louvers 51 when it is desired to use the apparatus as a blower, it is preferably to provide a convenient means for positively and effectively sealing these louvers during such time. One way in which this may be effectively accomplished is by means of a sheet metal element 101 bent to a configuration substantially the same as the exterior of the casing and provided throughout a substantial area in its end portion with a sealing strip of soft rubber or other resilient material 102, which when the strip 101 is mounted in position, serves to cover and seal the louvers 51. This element 101 may be retained in place by means of a fitting or collar 103 which is screwed into the threaded aperture 100. The collar 103 may be internally threaded and is adapted to receive a complementally formed portion 104 secured to the end of a flexible blower hose 105 in order that easy and convenient means are provided for securing the blower hose 105 in position with respect to the aperture 100. Thus, it will be seen that convenient means are provided for sealing the louvers 51 when it is desired to use the dust separator as a blower. It will be apparent that when the member 101 is seated in place with the resilient sealing members 102 covering the louvers 51, all air exhausted from the filter compartment will be forced out through the aperture 103 and may be directed as desired by any suitable apparatus conventional in the art.

Many other and further modifications of the invention falling within the scope of the subjoined claim will be apparent to those skilled in the art.

What is claimed is:

In a vacuum cleaner construction, a casing, said casing being preformed internally to provide a filter compartment, said casing having a plurality of louvers in the outer wall thereof serving to permit the escape of air from said filter compartment, said casing having in addition an aperture serving to permit the connection of a blower tube having communication with said compartment, and means for sealing said lovers to compel the air passing outwardly from said compartment to pass through said blower tube, said last named means including a resilient member engaging the edges of said louvers and a sheet metal backing member.

CLARENCE A. BROCK.